(No Model.)

S. BARRETT.
BELT SHIFTING APPARATUS.

No. 468,478. Patented Feb. 9, 1892.

Witnesses
John Whitehead
Harry Ellison

Inventor
Samuel Barrett
Per Samuel Hey
Attorney

UNITED STATES PATENT OFFICE.

SAMUEL BARRETT, OF KEIGHLEY, ENGLAND.

BELT-SHIFTING APPARATUS.

SPECIFICATION forming part of Letters Patent No. 468,478, dated February 9, 1892.

Application filed July 28, 1891. Serial No. 400,918. (No model.)

*To all whom it may concern:*

Be it known that I, SAMUEL BARRETT, a subject of the Queen of Great Britain, residing at Keighley, in the county of York, England, have invented a new and useful Improvement in Belt-Shifting Apparatus, of which the following is a specification.

My invention relates to improvements in belt-shifting apparatus in connection with which two driving-belts are employed, one of said driving-belts being to rotate a shaft in one direction at one time, while the other is to rotate same in the opposite direction at another time; and the object of my improvement is to produce belt-shifting apparatus which is simple in construction and arrangement and that shall alternately move or shift each of said driving-belts into and out of effective operation, respectively, or retain same in such a position that neither of them are in effective operation. This object I attain by the mechanism illustrated in the accompanying drawings, in which—

Figure 1:
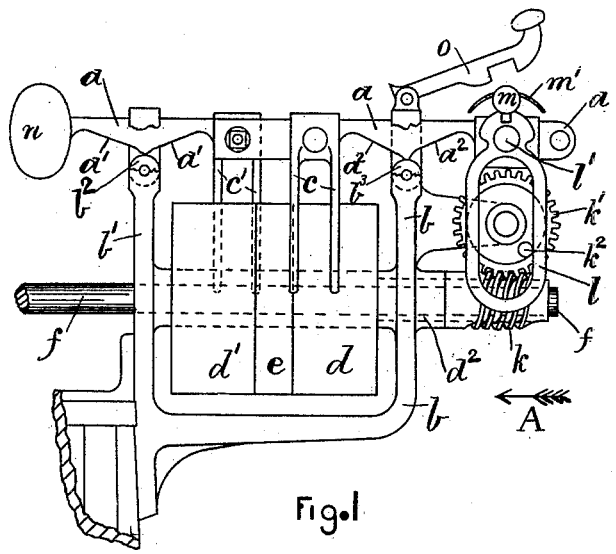
Figure 2:
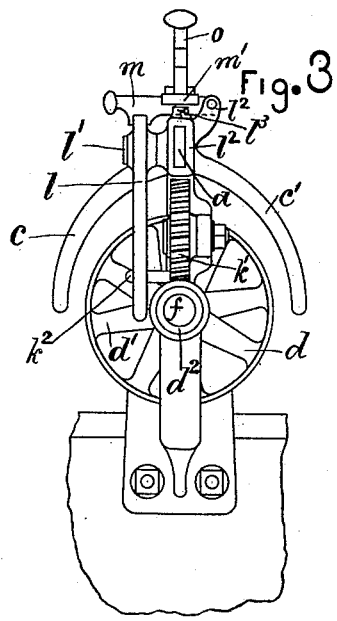
Figure 2:
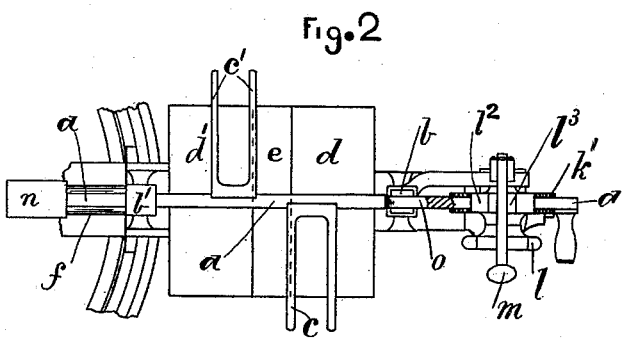

Figure 1 is a side elevation of belt-shifting apparatus made in accordance with my invention. Fig. 2 is a top view thereof; and Fig. 3 is end elevation as seen in the direction indicated by arrow A, Fig. 1.

Like letters of reference indicate like parts throughout the several views.

The belt-shifting apparatus consists of the sliding bar $a$, mounted so as to operate within the supports $b\ b'$. The belt-forks $c\ c'$ are attached to this bar $a$, so as to have command over the driving-belts imparting motion to the pulleys $d$ and $d'$, in order to shift one or the other of said belts from one or the other of these pulleys onto the central pulley $e$. The pulleys $d\ d'$ are mounted so as to rotate loosely upon their shaft $f$, while the pulley $e$ is rigidly attached thereto in order to rotate same. The driving-belts (not shown) are arranged to impart motion to the pulleys $d$ and $d'$ in opposite directions, so that when that of the pulley $d$ is shifted onto the central pulley $e$ the shaft $f$ is rotated in one direction, and when the belt of the pulley $d'$ is upon the said pulley $e$ the said shaft $f$ is rotated in the opposite direction, while when the belt-forks $c\ c'$ are in the position shown by Fig. 1 the driving-belts will be on the loose pulleys $d$ and $d'$, and so the shaft $f$ will be at rest. Upon the hub of the pulley $d$ I form a sleeve $d^2$, (shown in broken lines, Fig. 1,) which passes through the support $b$, in order that the worm $k$ may be rigidly mounted thereon, and by the driving-belt on the pulley $d$ being made sufficiently broad that when moved to entirely or sufficiently cover the pulley $e$ it does not completely leave the said loose pulley $d$; but enough of its breadth is allowed to remain overlapping said pulley $d$, in order to keep same in operation at all times when the driving-belt is moved. In this manner the worm $k$ is thereby rotated continuously. The worm $k$ rotates the wheel $k'$, which by its crank-pin $k^2$ operates the pendant $l$. This pendant $l$ is hinged at $l'$ to the part $l^2$, rigidly attached to the bar $a$, so that when the catch-piece $m$ is not within the notch in the outer end of this pendant $l$ it (said pendant $l$) is free to be oscillated by the crank-pin $k^2$, and thus will not impart any motion to the bar $a$. However, when the catch-piece $m$ is within the notch in the pendant $l$, as shown by Figs. 1 and 3, as the crank-pin $k^2$ rotates the bar $a$ will be reciprocated. Now on the bar $a$ are formed the inclines or cam-surfaces $a'\ a'$ and $a^2\ a^2$ to operate upon the anti-friction bowls $b^2\ b^3$, mounted in the supports $b\ b'$, by the actions of which through gravity the bar $a$ is caused to move at an increased rate of speed and independently of its motor crank-pin $k^2$, if it has by this crank-pin $k^2$ been moved in either direction, so that the respective meeting points of its inclines $a'\ a'$ and $a^2\ a^2$ are just beyond being vertically above the centers of the bowls $b^2$ and $b^3$, the opening in the pendant $l$, through which the pin $k^2$ operates, being sufficiently wide to allow this independent movement whenever this position is reached. To counterbalance the weight of the pendant $l$ and to add to the gravitating impetus of the bar $a$, a weight $n$ is mounted upon its inwardly-projecting end, as shown by Figs. 1 and 2. By this independent motion of the belt-forks $c\ c'$ the driving-belts are shifted in a most desirable manner and the "dwell" or time of remaining in the positions to which they have been moved for the purpose of imparting any desired number of revolutions to the shaft $f$ is effectually secured.

In order to retain the bar $a$ in its position, (shown by Fig. 1,) the catch-piece $m$ is raised out of contact with the pendant $l$ and the catch-piece $o$ is brought down to lay hold of the projecting piece $l^3$, formed on the part $l^2$, and by the piece $o$ being hinged to the rigid support $b$ the bar $a$ is thereby securely held. To avoid the possibility of the catch-piece $o$ laying hold of the part $l^3$ while the piece $m$ has hold of the pendant $l$, a guard or cover $m'$ is attached to or formed on the piece $m$, so that when said piece is beneath the piece $o$ should the latter be brought or fall by accident upon the former the guard $m'$ prevents it from laying hold thereof by enabling it to harmlessly slide over.

I claim—

1. In belt-shifting mechanism, the combination of a loose pulley $d$, having a sleeve $d^2$, a worm $k$, a wheel $k'$, having a crank-pin $k^2$, a pendant $l$, hinged as described, catch-piece $m$ for engaging with said pendant $l$, sliding bar $a$, formed with inclines $a'\ a'$ and $a^2\ a^2$, and belt-forks $c\ c'$, as and for the purposes specified.

2. In belt-shifting mechanism, the combination of a sliding bar $a$, having inclines $a'\ a'$ and $a^2\ a^2$, as shown, a pendant $l$, attached to said bar $a$, and means for operating this pendant $l$, substantially as specified.

3. In belt-shifting mechanism, the combination, with a reciprocating bar $a$, having inclines, as shown, and means whereby it receives part of its reciprocatory motion from a rotary pulley, of a counterbalancing-weight $n$ for accelerating the remaining part of its movement accomplished by the action of gravity, substantially as specified.

4. In belt-shifting mechanism, the combination of the holding-catch $o$ with the reciprocating bar $a$, having inclines $a'\ a'$ and $a^2\ a^2$ for effecting part of the sliding motion of said bar $a$, means for effecting the other part of the sliding motion of said bar $a$, and belt-forks $c\ c'$, attached to said bar $a$, substantially as herein specified, and for the purpose set forth.

5. In belt-shifting mechanism, the combination of a catch-piece $m$, having a cover $m'$, with a holding-piece $o$, said cover $m'$ being arranged to operate substantially as specified.

SAMUEL BARRETT.

Witnesses:
SAMUEL HEY,
JOHN WHITEHEAD.